United States Patent
Wei et al.

(10) Patent No.: US 7,119,044 B2
(45) Date of Patent: Oct. 10, 2006

(54) MULTIPLE WASHCOATS ON FILTER SUBSTRATE

(75) Inventors: Ming Wei, Broken Arrow, OK (US); Thomas R. Pauly, Broken Arrow, OK (US); Jiyang Yan, Broken Arrow, OK (US); Danan Dou, Tulsa, OK (US)

(73) Assignee: Delphi Technologies, Inc., Troy, MI (US)

( * ) Notice: Subject to any disclaimer, the term of this patent is extended or adjusted under 35 U.S.C. 154(b) by 403 days.

(21) Appl. No.: 10/460,028

(22) Filed: Jun. 11, 2003

(65) Prior Publication Data

US 2004/0254073 A1    Dec. 16, 2004

(51) Int. Cl.
*B01J 23/00* (2006.01)
*B01J 35/04* (2006.01)
*B01J 37/02* (2006.01)

(52) U.S. Cl. ............ 502/300; 502/302; 502/349; 502/325; 502/344; 502/305; 502/353; 502/340; 502/514; 502/527.12; 502/355; 502/303; 502/304; 502/439; 423/239.1; 423/651; 423/247; 423/245.3; 423/215.5; 252/373

(58) Field of Classification Search ............... 502/300, 502/302, 349, 325, 344, 305, 353, 340, 514, 502/527.12, 355, 303, 304, 439; 423/239.1, 423/651, 247, 245.3, 215.5; 252/373
See application file for complete search history.

(56) References Cited

U.S. PATENT DOCUMENTS

| | | | |
|---|---|---|---|
| 6,365,118 B1 | 4/2002 | Kharas et al. | 423/213.2 |
| 6,391,822 B1 | 5/2002 | Dou et al. | 502/325 |
| 6,468,484 B1 | 10/2002 | Dou et al. | 423/213.2 |
| 6,497,092 B1 | 12/2002 | Theis | 60/274 |
| 6,508,852 B1 * | 1/2003 | Hickman et al. | 55/523 |
| 6,770,252 B1 * | 8/2004 | Cheng | 423/239.1 |
| 2004/0116276 A1 * | 6/2004 | Yezerets et al. | 502/34 |
| 2004/0116285 A1 * | 6/2004 | Huang et al. | 502/325 |

FOREIGN PATENT DOCUMENTS

| | | |
|---|---|---|
| EP | 0984142 A1 | 4/1998 |
| EP | 0 942 157 B1 | 5/2002 |
| EP | 1 270 886 A1 | 1/2003 |
| EP | 1 286 028 A2 | 2/2003 |
| EP | 1398069 A2 | 8/2003 |
| WO | WO01/12320 | 2/2001 |

OTHER PUBLICATIONS

European Search Report—Dated Oct. 5, 2004.

* cited by examiner

*Primary Examiner*—Timothy C. Vanoy
(74) *Attorney, Agent, or Firm*—Paul L. Marshall

(57) ABSTRACT

An integrated multi-functional catalyst system includes a diesel particulate filter having an inlet side for receiving flow and an opposite outlet side, a substrate in the diesel particulate filter having an interior wall surface and an exterior wall surface, a first washcoat layer applied to the interior wall surface and adjacent the inlet side, and a second washcoat layer applied to the exterior wall surface and adjacent the outlet side, wherein flow distribution through the substrate is dispersed for minimizing back pressure. The diesel particulate filter may be one of a plurality of honeycomb cells.

27 Claims, 2 Drawing Sheets

MULTIPLE WASHCOATS ON FILTER SUBSTRATE

BACKGROUND OF THE INVENTION

This invention relates to a filter for removal of particulate matter in an exhaust gas stream, and more particularly, to a diesel particulate filter ("DPF") and a coating process for a substrate of a DPF.

In order to meet exhaust emission standards, which are becoming more and more stringent, sophisticated catalyst systems are in development. Especially for diesel engine exhaust emission control, much more complicated catalyst systems are increasingly required because of the lean condition and presence of particulate matter in exhaust gas stream. As these standard become increasingly tightened, exhaust treatment systems may include an oxidation catalyst for the conversion of CO and hydrocarbon to $CO_2$, a diesel particulate filter ("DPF") for the removal of particulate matter, and a catalyst such as a NOx adsorber to remove NOx from the exhaust stream. These specific functions are essential components in the treatment of diesel exhaust. In addition, the regeneration of DPF and/or NOx adsorber catalysts may require additional catalysts downstream for an efficient removal of pollutants from the gas stream. Thus a complete catalyst system for diesel engine exhaust gas might comprise of three to four bricks of catalysts to meet the emission standard. Such a complex system would be impractical due to high cost associated with the catalyst, the canning, the system integration, etc.

The flow restriction (backpressure) of emission treatment systems has significant impact on engine performance and fuel economy. In general, the lower the backpressure, the better the engine performance and fuel economy will be. In catalytic emission after-treatment systems with honeycomb catalysts, most of the flow restriction is created by the honeycomb catalyst. The flow restriction is even more prominent when the honeycomb substrate is changed from a channel flow device to a wall-flow device. Multiple catalyst systems, therefore, that include DPF type wall flow devices again become impractical due to the severe flow restriction across the system. That is, high washcoat loading, such as for increased NOx adsorber function, leads to high backpressure increase on DPF type of substrate, which may deleteriously affect engine performance and fuel economy.

BRIEF SUMMARY OF THE INVENTION

The above discussed and other drawbacks and deficiencies of the prior art are overcome or alleviated by an integrated multi-functional catalyst system. In an exemplary embodiment of the invention, the integrated multi-functional catalyst system includes a diesel particulate filter having an inlet side for receiving flow and an opposite outlet side, a substrate in the diesel particulate filter having an interior wall surface and an exterior wall surface, a first washcoat layer applied to the interior wall surface and adjacent the inlet side, and a second washcoat layer applied to the exterior wall surface and adjacent the outlet side, wherein flow distribution through the substrate is dispersed for minimizing back pressure.

In another exemplary embodiment of the invention, an integrated multi-functional catalyst system includes a diesel particulate filter having an inlet side for receiving flow and an opposite outlet side, a plurality of honeycomb cells within the diesel particulate filter, wherein alternating exit channels are blocked at the inlet side and alternating inlet channels are blocked at the opposite outlet side, a substrate for each of the inlet channels, each substrate having an interior wall surface and an exterior wall surface, a first washcoat layer applied to the interior wall surface and adjacent the inlet side, and a second washcoat layer applied to the exterior wall surface and adjacent the outlet side, wherein flow distribution through the substrate is dispersed for minimizing back pressure.

In another exemplary embodiment of the invention, a method of manufacturing an integrated multi-functional catalyst system includes providing a diesel particulate filter having an inlet side for receiving flow and an opposite outlet side, providing a substrate in the diesel particulate filter having an interior wall surface and an exterior wall surface, applying a first washcoat layer to the interior wall surface adjacent the inlet side, and applying a second washcoat layer to the exterior wall surface and adjacent the outlet side, wherein flow distribution through the substrate is dispersed for minimizing back pressure.

The above discussed and other features and advantages will be appreciated and understood by those skilled in the art from the following detailed description and drawings.

BRIEF DESCRIPTION OF THE DRAWINGS

Referring to the exemplary drawings wherein like elements are numbered alike in the several FIGS..

DETAILED DESCRIPTION OF THE INVENTION

Figure 1:
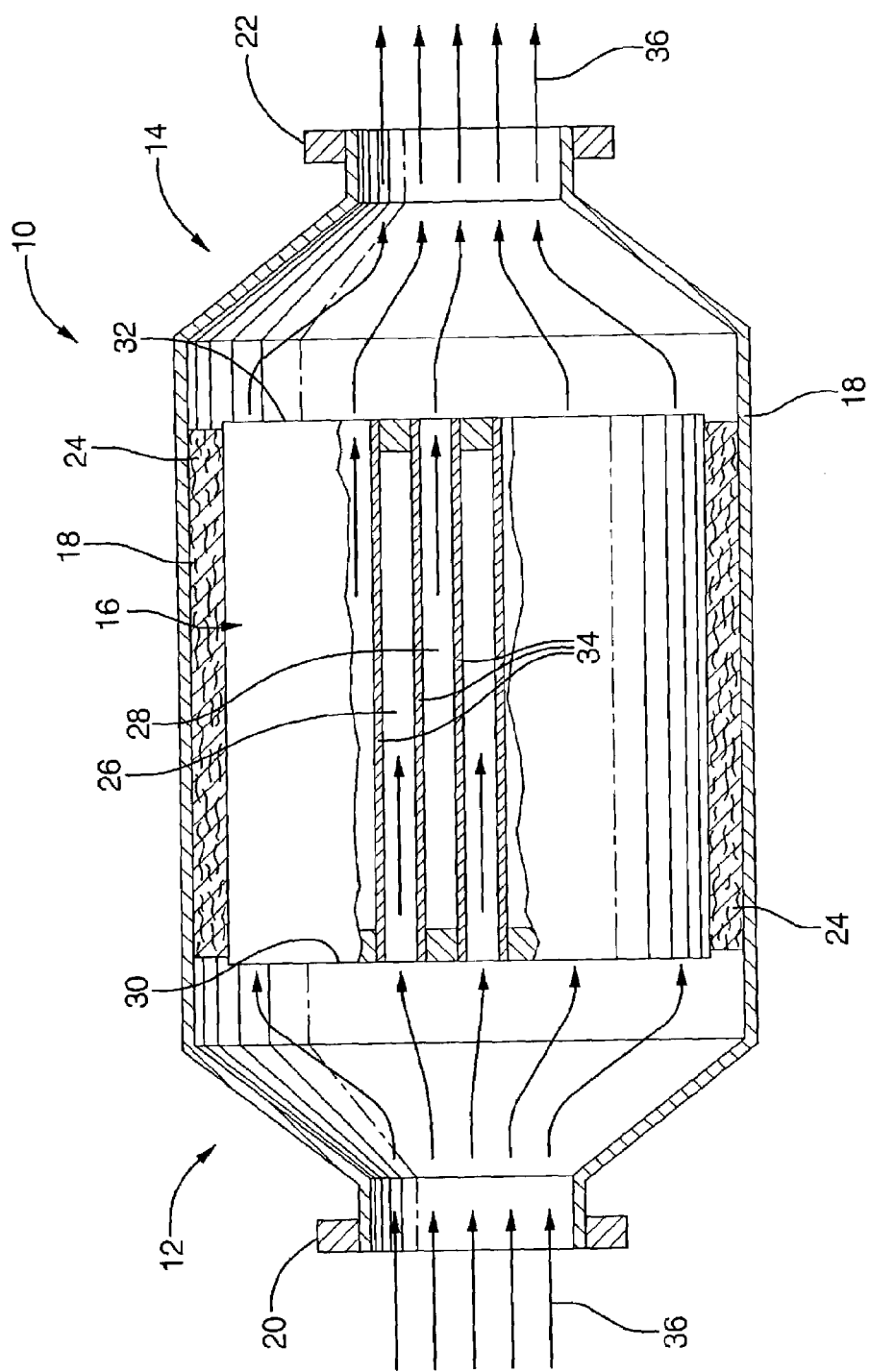
FIG. 1 shows a cross-sectional view of a particulate trap including a catalytic particulate filter, which is shown in partial cut-away view.

Referring to FIG. 1, a particulate trap 10 may be part of an exhaust gas emission control system in which an inlet 12 on the particulate trap 10 is in fluid communication with an exhaust manifold of an internal combustion engine (e.g., a diesel engine), and an outlet 14 on the trap 10 is in fluid communication with an exhaust gas destination, such as atmosphere. In addition, the system may comprise various other emission control devices including catalytic converters, evaporative emission devices, scrubbing devices, adsorbers/absorbers, non-thermal plasma reactors, mufflers, and the like, as well as combinations comprising at least one of the foregoing devices.

The particulate trap 10 comprises a particulate filter element 16 enclosed within a housing or canister 18. The canister 18 may have an input collar 20 connectable to the exhaust manifold or other components in the system such as a turbocharger, and an output collar 22 connectable to the tailpipe or other components in the system. Located between the filter element 16 and the interior of the canister 18 is a retention or support material 24 that supports and protects the filter element 16, and insulates the canister 18 from both the high exhaust gas temperatures and the exothermic catalytic reaction occurring within the filter element 16.

Figure 2:
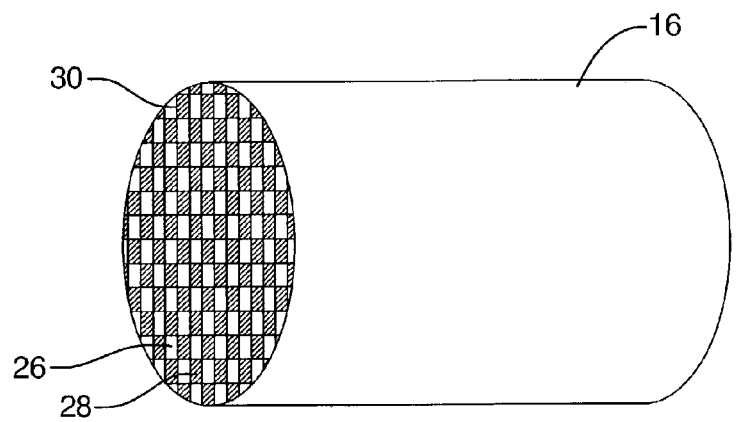
FIG. 2 shows a perspective view of an embodiment of the catalytic particulate filter; and, FIG. 3 is a side cross-sectional view of an integrated multi-functional catalyst system for automotive emission control.

The filter element 16, which is shown in a partial cutaway view, may comprise a gas permeable ceramic material having a honeycomb structure consisting of a plurality of channels, preferably parallel channels. The channels may be divided into alternating inlet channels 26 and exit channels 28. The inlet channels 26 are open at an inlet end 30 of the filter element 16 and preferably plugged at an exit end 32 of the filter element 16. Conversely, exit channels 28 are preferably plugged at the inlet end 30 and open at the exit end 32. The inlet and exit channels 26, 28 are formed and separated by thin porous longitudinal sidewalls 34, which permit exhaust gases 36 to pass from the inlet channels 26 to the exit channels 28 along their length. As shown in FIG. 2, the filter element 16 may be a generally cylindrical structure with a plurality of inlet and outlet channels 26, 28 disposed therein. The inlet and exit channels 26, 28 may have a substantially rectangular cross-sectional shape. However, the channels 26, 28 may have any multi-sided or rounded shape, with substantially square, triangular, pentagonal, hexagonal, heptagonal, or octagonal or similar geometries. The dimensions of the inlet and exit channels 26, 28 depend on various design considerations, including space limitations, projected washcoat loading, and end use requirements.

As will be further described with reference to FIG. 3, disposed on and/or in the sidewalls 34 forming the inlet and outlet channels 26, 28 is a layer of a washcoat composition comprising a catalytically active material. The washcoat composition is applied to the sidewalls 34 and are coated such that a concentration of the catalytically active material disposed thereon/therein is anisotropic along the length of the inlet and/or outlet channels.

The catalytic material may be any catalyst capable of reducing the concentration of at least one component in the exhaust gas. Thus, the catalyst may comprise one or more catalytic materials. The catalytic materials may be wash coated, imbibed, impregnated, physisorbed, chemisorbed, precipitated, or otherwise applied to the filter. Possible catalyst materials include metals, such as barium, cesium, vanadium, molybdenum, niobium, tungsten platinum, palladium, lithium, potassium, rhodium, iridium, ruthenium, zirconium, yttrium, cerium, lanthanum, and the like, as well as oxides, alloys, and combinations comprising at least one of the foregoing catalyst materials, and other catalysts.

In operation, exhaust gas 36 generated by the internal combustion engine passes through the exhaust gas manifold into the inlet channels 26 of the filter element 16. The exhaust gas passes through the sidewalls 34 into the exit channels 28, and the porous sidewalls 34 permit the exhaust gas 36 to pass from the inlet channels 26 to the outlet channels 28 such that the inlet channels 26 collect particulates contained in the exhaust gas 36. The catalyst material promotes removal (e.g., oxidation) of the particulates from the exhaust gas 36. From the exit channels 28, the exhaust gas 36 flows toward the exhaust gas destination.

This integrated catalytic system for diesel emission control utilizes a single brick DPF substrate which carries multiple washcoats for different functions, such as NOx adsorber catalyst, light-off catalyst, fuel reforming catalyst, oxidation catalyst, lean NOx catalyst. The coating process developed and described in copending U.S. patent application Ser. No. 10/460,569 and copending U.S. patent application Ser. No. 10/460,606, both filed concurrently herewith and both incorporated by reference in their entirety, describe the placement of washcoats on desired locations, so that using only one brick catalyst may be better able to meet emission standards. Copending U.S. patent application Ser. No. 10/460,569 and copending U.S. patent application Ser. No. 10/460,606 describe coating processes for DPF types of substrates which provide the ability to control the washcoat location and back pressure increase after wash coating and therefore enable the catalyst system for diesel exhaust emission control described herein.

Figure 3:
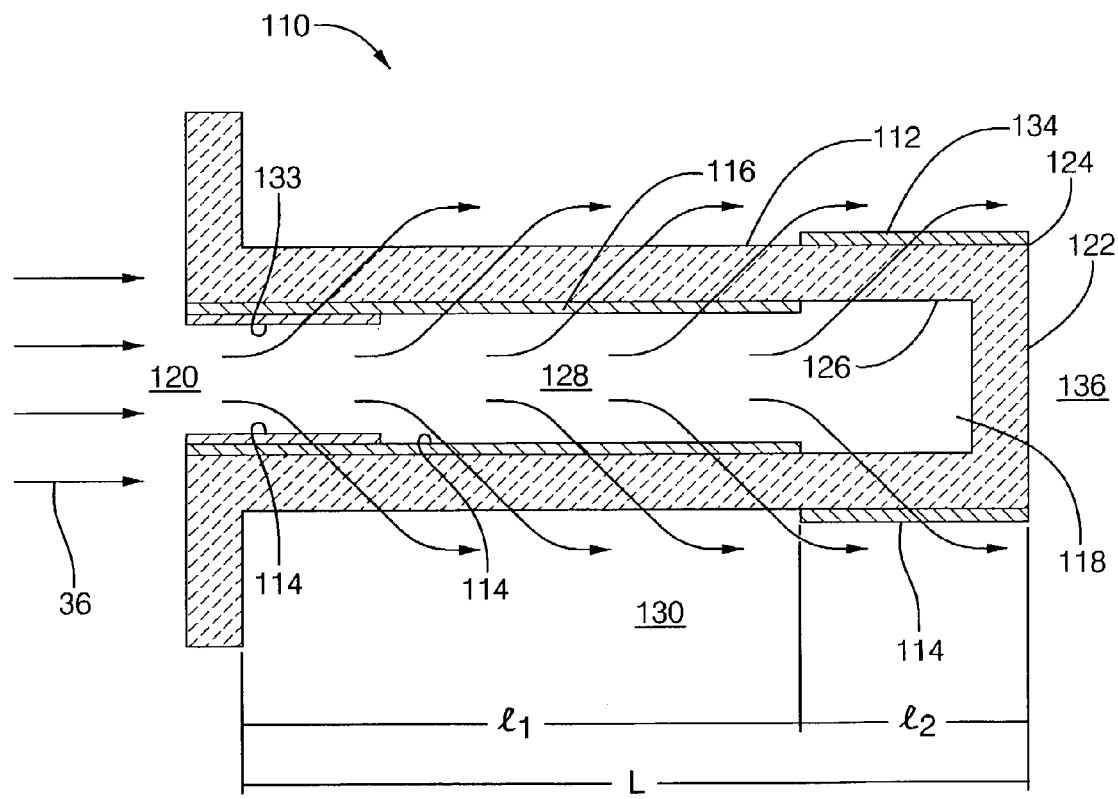

As shown in FIG. 3, the integrated catalyst system 110 for automotive exhaust emission control, especially for diesel exhaust gas, includes a DPF substrate 112 employed as a trap for particulate matter and as a carrier of washcoats 114 of different functions, such as NOx adsorber, diesel oxidation catalysts ("DOC"), fuel reforming catalyst, and lean NOx catalyst. Although only an inlet channel, such as inlet channel 26, is shown, it should be understood that the alternating inlet and outlet channels would be present in the system 110. The system 110 includes an inlet 120 for receiving diesel exhaust gas into a channel 118, and an outlet side 136. The inlet 120 corresponds to inlet 12 and the outlet side 136 corresponds to outlet 14. The substrate 112 includes a wall 122, corresponding to sidewalls 34 of FIG. 1, which may be tubular in form or any of the shapes described with respect to sidewalls 34, having an interior wall surface 126 and an exterior wall surface 124. It should be understood that the interior wall surface 126 is actually an exterior wall surface for an adjacent cell (for an exit channel 28) of the honeycomb structure shown in FIG. 2 and that the exterior wall surface 124 is actually an interior wall surface for that same adjacent cell. Because that adjacent cell is blocked at the inlet, the flow 36 is filtered through the interior 128 of the particularly described substrate 112 from the interior wall surface 124 to the exterior wall surface 126. The interior 128 of the system 110 receives the flow 36 of exhaust from the inlet 120 and expels treated exhaust to an exterior 130 of the system 110 through an exit channel. The washcoats 114 are preferably applied at the locations where each washcoat 114 is functionally desired. For example, a NOx adsorber washcoat 116 is needed for converting NOx in lean condition. This washcoat 116 can be coated throughout the length of the channel 118 on the interior wall surface 126, or only part of the length near to the inlet 120, if another washcoat 114 on the exterior wall surface 124 is needed for other functions. A washcoat gradient with higher washcoat loading in the beginning of the channel 118 will be beneficial to performance of NOx reduction with this NOx adsorber washcoat 116 for better function of catalyst system. The NOx adsorber washcoat 116 would also function as catalyst for catalytic soot combustion.

The function of another washcoat 133 located near the inlet 120 could vary based on application, which means the composition of the washcoat 133 may also vary. For active regeneration of accumulated soot, this washcoat 133 would light off (ignite) the fuel injected for generating heat to start burning the soot. A washcoat with fuel reforming function would be employed for more efficient regeneration of NOx adsorber washcoat 116. The NOx adsorber washcoat 116 function requires exhaust gas periodically changing in lean/rich cycle. The NOx would be stored during lean period. When NOx storage capacity is fully loaded, a rich cycle would start for regenerating the NOx adsorber washcoat 116 by providing reducing reagent, such as hydrocarbon, CO, and hydrogen. CO and hydrogen would be more efficient for NOx adsorber capacity regeneration. The fuel reforming washcoat 133 would convert the fuel (hydrocarbon) to CO and hydrogen for better recovery of NOx adsorber capacity, which would improve the overall NOx adsorber performance. The washcoat 133 would be also designed to be dual functional for fuel light-off (oxidation) and fuel reforming. For certain applications, however, the NOx adsorber washcoat 116 could be also located on the exterior wall surface 124 for better utilization of washcoat, while the DOC light-off washcoat for diesel oxidation catalysts on the interior wall surface 126 is for active regeneration of collected soot.

A washcoat, such as washcoat 134, could be loaded on the exterior wall surface 124 (adjacent outlet side 136) for additional function of catalyst system 110. This washcoat 134 may clean up the rest of the pollutants that slip through the wall 122. An oxidation catalyst may be employed, because high concentration of hydrocarbon and CO could be found at the outlet side 136 of DPF during regeneration period of NOx adsorber washcoat 116 regeneration and soot combustion. An oxidation catalyst washcoat 134 on the exterior wall surface would remove these hydrocarbon and CO from the exhaust gas 36. In another embodiment, a lean NOx catalyst washcoat for removing NOx, especially during the regeneration cycle, may be employed (where the lean NOx washcoat is different from NOx adsorber washcoat). The choice of the functions of this washcoat would depend on the applications. A combination of these two washcoats would be useful for certain applications.

Another feature of this integrated catalyst system 110 is the locations of the washcoats 114 for controlling the back pressure of coated DPF substrate 112, especially for multiple pass coated catalysts. Putting one washcoat (e.g. washcoat 116) only on a portion $l_1$ of one side (e.g. interior wall surface 124 of an inlet channel) of the substrate 112 and another washcoat (e.g. washcoat 134) on a remainder of the length L of substrate 112, or portion $l_2$, on the other side (e.g. exterior wall surface 126, or the interior of an exit channel), as shown in FIG. 3, would keep the back pressure low. Although $l_1+l_2$ may equal L, it should be understood that the lengths of $l_1$ and $l_2$ may overlap through a portion such that $l_1+l_2$ is slightly greater than L or there may even be greater overlap or a small lack of coverage of washcoat, depending on the function of the washcoats and the degree to which back pressure would be affected. The architecture of washcoats shown in FIG. 3 would balance the flow restriction and therefore allow an even flow distribution through the wall 122, which leads to maximum utilization of washcoats 114, that is essential for NOx adsorber performance. It should be understood that the locations and sizes (lengths and thicknesses) of washcoats 114 shown in FIG. 3 are exemplary only, as an array of washcoat sizes and placements are within the scope of this system 110. Also, the particularities of the functions of each washcoat 114 are also subject to change based on the application of the system 110.

While the particulars of the functions contained within the washcoats have been described, it should be understood that the functions may be exchanged. For example, the functions contained within washcoat 116 (NOx adsorber or other functions) and 134 (oxidation catalyst or other functions) may be reversed, such that washcoat 116 contains an oxidation catalyst function or other related functions and washcoat 134 contains a NOx adsorber function or other related functions. Washcoat 133 which overlaps washcoat 116 may instead overlap washcoat 134, such as adjacent the exterior wall surface 124, thus sandwiched between exterior wall surface 124 and washcoat 134.

The coating process described in copending U.S. patent application Ser. No. 10/460,569 and copending U.S. patent application Ser. No. 10/460,606, as incorporated by reference in their entirety above, enables the preparation of the integrated catalyst system 110 on a single brick of catalysts as described above. Washcoat location in the substrate has an important effect on activity of automobile emission control catalysts. Control of washcoat location is one of the processing challenges of coating channel-flow honeycomb substrates. The process of controlling washcoat location is even more challenging for coating diesel particulate filters. DPF's are wall-flow honeycomb substrate with alternatively plugged channels. Washcoat location control in DPF's is difficult because the slurry is filled into the channels which opposite ends are plugged making it more difficult to move the slurry to desired location using conventional forces. To better utilize the limited quantity of catalytic washcoat, to minimize backpressure created by washcoat layer, and to improve catalytic converter performance under certain conditions (e.g. lightoff), locating the washcoat in a specific region of the DPF substrate is preferred. As described in copending U.S. patent application Ser. No. 10/460,569 and copending U.S. patent application Ser. No. 10/460,606, the coating process may include setting the DPF substrate on coater, with marked inlet end down, pushing a predetermined amount of slurry into the substrate from the inlet end, and clearing the substrate channel and removing excess liquid from the part by applying vacuum from either end of the substrate based on the desired location of the washcoat. For example, the first clearing could be accomplished by applying a vacuum in the same direction as slurry was applied to the part and then flip part for applying vacuum a second time, if high washcoat loading at the inlet portion of the substrate is desired.

For evenly loading washcoat throughout the substrate, slurry solid content should be adjusted to allow even number of passes to achieve the total loading and every time the substrate would be fully charged with slurry. For the first coating pass of a two-pass coating, the clearing practice is the same as previously described. For the second coating pass, the vacuum is first applied in the opposite direction that the slurry was applied to the part, then the part is flipped and a second vacuum clearing is applied. It should be understood that the first coating pass loads more washcoat at outlet portion of the part, but, after the second pass, the washcoat distribution becomes more even.

For heavily loading washcoat at the inlet portion of the substrate, slurry is pushed only partially into the substrate, followed by standard vacuum clearing practice. The washcoat gradient is generated with higher washcoat loading on the inlet portion.

To heavily load the washcoat at the outlet portion of the substrate, one pass coating and 100% slurry fill is used. Using the standard clearing method or applying high vacuum in the first clearing (on the outlet end of the substrate, then flip part, apply vacuum on the other end (inlet) of the part), can force more slurry to move towards the outlet portion of the part.

To partially load washcoat only at the inlet portion of the substrate, the washcoat can be loaded only on part of the substrate (e.g. inlet end). With push-pull process, the excessive slurry is removed from inlet end of the substrate, followed by standard vacuum cleaning process with first applying vacuum from the inlet end. By controlling the amount of slurry charged into the substrate (e.g., 30%, 50%, 70%, etc.), the ability to control the length of the washcoat at the inlet end of the DPF is enabled. A similar method can be used for partially loading washcoat only at the outlet portion of the substrate.

By repeating this procedure with slurries of various catalytic functions, the integrated catalyst system 110 on a single substrate brick for diesel emission control can be prepared. A calcinations step is needed between each coating step. This four (or multiple) way catalyst is capable of reducing pollutants including NOx, CO, hydrocarbons, and particulate matter from the exhaust of an internal combustion engine, particularly a diesel engine. A particulate filter type substrate is used as a carrier for multi-functional washcoats for simultaneous removal of the four major pollutants that exist in diesel exhaust. This catalyst 110 system can simplify the catalytic emission system for diesel exhaust gas purification. The low cost coating process could enable manufacturing of combined catalyst system on a single brick with significant savings and package advantages to customers. In an alternative embodiment, more than one brick may be employed, with at least one brick embodying multiple washcoats as described above, thus still reducing the number of bricks needed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An integrated multi-functional catalyst system comprising:
    a diesel particulate filter having an inlet side for receiving flow and an opposite outlet side;
    a substrate in the diesel particulate filter having an interior wall surface and an exterior wall surface;
    a first washcoat layer disposed on a portion of the interior wall surface, wherein the portion is less than the entire length of the interior wall surface; and,
    a second washcoat layer disposed on a portion of the exterior wall surface, wherein the portion is less than the entire length of the exterior wall surface.

2. The integrated multi-functional catalyst system of claim 1 further comprising a third washcoat layer applied at least partially over the first washcoat layer.

3. The integrated multi-functional catalyst system of claim 1 wherein the second washcoat layer contains a catalytic oxidation function.

4. The integrated multi-functional catalyst system of claim 1 wherein the second washcoat layer contains a catalytic lean NOx function.

5. The integrated multi-functional catalyst system of claim 1 wherein the first washcoat layer occupies a first length of the substrate, the second washcoat layer occupies a second length of the substrate, wherein a sum of the first length and the second length is approximately equal to a total length of the substrate.

6. The integrated multi-functional catalyst system of claim 1 wherein the substrate is one of a plurality of substrates forming a honeycomb structure in the diesel particulate filter.

7. The integrated multi-functional catalyst system of claim 1 wherein the substrate is blocked adjacent the outlet side of the diesel particulate filter, the substrate defining an inlet channel for the diesel particulate filter.

8. The integrated multi-functional catalyst system of claim 1 wherein the integrated multi-functional catalyst system comprises a single brick.

9. The integrated multi-functional catalyst system of claim 1 wherein the first washcoat layer has a greater length than the second washcoat layer.

10. The integrated multi-functional catalyst system of claim 1 wherein the second washcoat layer has a greater length than the first washcoat layer.

11. The integrated multi-functional catalyst system of claim 1 wherein the first washcoat layer and the second washcoat layer each contain one of an NOx adsorber function, a catalytic oxidation function, a catalytic lean NOx function, and a fuel reforming function, wherein the first washcoat layer and the second washcoat layer contain different functions.

12. An integrated multi-functional catalyst system comprising:
    a diesel particulate filter having an inlet side for receiving flow and an opposite outlet side;
    a substrate in the diesel particulate filter having an interior wall surface and an exterior wall surface;
    a first washcoat layer applied to the interior wall surface and adjacent the inlet side;
    a second washcoat layer applied to the exterior wall surface and adjacent the outlet side, wherein flow distribution through the substrate is dispersed for minimizing back pressure; and,
    wherein the first washcoat layer contains an NOx adsorber function.

13. The integrated multi-functional catalyst system of claim 12 further comprising a third washcoat layer applied at least partially over the first washcoat layer, wherein the third washcoat layer contains a fuel reforming function for partial oxidation of exhaust HC into species including CO and $H_2$, wherein said species promote release and reduction of stored NOx during regeneration of the NOx adsorber washcoat.

14. The integrated multi-functional catalyst system of claim 12 further comprising a third washcoat layer applied at least partially over the first washcoat layer, wherein the third washcoat layer contains an oxidation catalyst function.

15. An integrated multi-functional catalyst system comprising:
    a diesel particulate filter having an inlet side for receiving flow and an opposite outlet side;
    a plurality of honeycomb cells within the diesel particulate filter, wherein alternating exit channels are blocked at the inlet side and alternating inlet channels are blocked at the opposite outlet side;
    a substrate for each of the inlet channels, each substrate having an interior wall surface and an exterior wall surface;
    a first washcoat layer disposed on a portion of the interior wall surface, wherein the portion is less than the entire length of the interior wall surface; and,
    a second washcoat layer, containing a different function than the first washcoat layer disposed on a portion of the exterior wall surface, wherein the portion is less than the entire length of the exterior wall surface.

16. The integrated multi-functional catalyst system of claim 15 wherein the first washcoat layer and the second washcoat layer each contain one of an NOx adsorber function, a catalytic oxidation function, a catalytic lean NOx function, and a fuel reforming function.

17. The integrated multi-functional catalyst system of claim 15 further comprising a canister containing the diesel particulate filter.

18. The integrated multi-functional catalyst system of claim 15 wherein the canister is a single brick canister.

19. The integrated multi-functional catalyst system of claim 15 wherein the first washcoat layer contains a NOx adsorber function, the integrated multi-functional catalyst system further comprising a third washcoat layer applied at least partially over the first washcoat layer, wherein the third washcoat layer contains a fuel reforming function for partial oxidation of exhaust HC into species including CO and $H_2$, wherein said species promote release and reduction of stored NOx during regeneration of the NOx adsorber washcoat.

20. A method of manufacturing an integrated multi-functional catalyst system, the method comprising:
   providing a diesel particulate filter having an inlet side for receiving flow and an opposite outlet side;
   providing a substrate in the diesel particulate filter having an interior wall surface and an exterior wall surface;
   applying a first washcoat layer to a portion of the interior wall surface wherein the portion is less than the entire length of the interior wall surface; and,
   applying a second washcoat layer, containing a different function than the first washcoat layer, to a portion of the exterior wall surface, wherein the portion is less than the entire length of the exterior wall surface.

21. The method of claim 20 wherein applying the first washcoat layer comprises applying a washcoat with an NOx adsorber function.

22. The method of claim 21 further comprising applying a third washcoat layer at least partially over the first washcoat layer, wherein the third washcoat layer contains a fuel reforming function for partial oxidation of exhaust HC into species including CO and $H_2$, wherein said species promote release and reduction of stored NOx during regeneration of the NOx adsorber washcoat.

23. The method of claim 20 wherein applying the second washcoat layer comprises applying a washcoat with a catalytic oxidation function.

24. The method of claim 20 wherein applying the second washcoat layer comprises applying a washcoat with a catalytic lean NOx function.

25. An integrated multi-functional catalyst system comprising:
   a diesel particulate filter;
   a substrate disposed within the diesel particulate filter, wherein the substrate comprises a wall;
   a first washcoat layer disposed a first length at the wall; and,
   a second washcoat layer disposed a second length at the wall, wherein the first length is greater than the second length.

26. The integrated multi-functional catalyst system of claim 25 wherein the first washcoat layer and the second washcoat layer are disposed on differing walls of the substrate.

27. An integrated multi-functional catalyst system comprising:
   a diesel particulate filter;
   a substrate disposed within the diesel particulate filter, wherein the substrate comprises a wall;
   a first washcoat layer disposed at the wall;
   a second washcoat layer disposed at the wall; and,
   a third washcoat layer disposed at the wall.

* * * * *